United States Patent [19]

Peek et al.

[11] Patent Number: 4,559,614
[45] Date of Patent: Dec. 17, 1985

[54] INTERACTIVE CODE FORMAT TRANSFORM FOR COMMUNICATING DATA BETWEEN INCOMPATIBLE INFORMATION PROCESSING SYSTEMS

[75] Inventors: Charles L. Peek, Austin; Phillip C. Richey; James H. Summers, both of Round Rock, all of Tex.

[73] Assignee: International Business Machines Corporation, Armonk, N.Y.

[21] Appl. No.: 510,513

[22] Filed: Jul. 5, 1983

[51] Int. Cl.[4] .............................................. G06F 5/00
[52] U.S. Cl. ..................... 364/900; 340/735; 340/790
[58] Field of Search ... 364/200 MS File, 900 MS File, 364/521; 370/60, 61, 94; 340/735, 790

[56] References Cited

U.S. PATENT DOCUMENTS

| | | | |
|---|---|---|---|
| 3,846,763 | 11/1974 | Riikonen | 364/200 |
| 4,127,896 | 11/1978 | Raslavaky, III | 364/200 |
| 4,202,041 | 5/1980 | Kaplow et al. | 364/900 |
| 4,258,361 | 3/1981 | Hydes et al. | 340/790 X |
| 4,281,315 | 7/1981 | Bauer et al. | 340/147 |
| 4,330,847 | 5/1982 | Kuseski | 364/900 |
| 4,433,376 | 2/1984 | Lombardo, Jr. et al. | 364/200 |
| 4,433,377 | 2/1984 | Eustis et al. | 364/200 |
| 4,435,777 | 3/1984 | McCaskill et al. | 364/900 |
| 4,441,163 | 4/1984 | Leikam et al. | 364/900 |
| 4,477,880 | 10/1984 | Advani et al. | 364/900 |

FOREIGN PATENT DOCUMENTS

A076902 2/1983 European Pat. Off. .

OTHER PUBLICATIONS

IBM Technical Disclosure Bulletin, J. A. Weiss, "High-Speed Translation Mechanism", vol. 25, No. 1, Jun., 1982, pp. 59–61.

8029 Electronic Engineering, K. Rallapalli, "Exceptional Features of the AM Z8000 Instruction Set", vol. 52 (1980) Sep., No. 642, London GB, pp. 95–104.

Primary Examiner—James D. Thomas
Assistant Examiner—Thomas Lee
Attorney, Agent, or Firm—John W. Henderson, Jr.; Douglas H. Lefeve

[57] ABSTRACT

A method and apparatus for transforming data transmitted from a remote information processing system which operates in a first internal code format to the internal code format of a second receiving information processing system. The method includes a control program for operating the receiving information processing system in an interactive mode with the operator. The control program displays prompts and command options to the operator which enables the operator to construct a transform table of conversion characters for the communication session. The conversion table is also useable by the control program routines to reverse the data transmission operation by converting the internal code format of the second information processing system to the internal code format of the first information processing system for data transmission in the opposite direction.

8 Claims, 10 Drawing Figures

INTERACTIVE CODE FORMAT TRANSFORM FOR COMMUNICATING DATA BETWEEN INCOMPATIBLE INFORMATION PROCESSING SYSTEMS

TECHNICAL FIELD

This invention relates generally to information processing systems and, more particularly, to methods and apparatus for a system operator to interact with an information processing system to provide a code format transform to facilitate communication between information processing systems operating in different data codes.

BACKGROUND ART

Prior art information processing systems have provided a limited amount of interaction with the user for the purpose of enabling the user to define control functions and input/output devices for the information processing system. For example, U.S. Pat. No. 4,202,041 issued 6 May 1980 to Kaplow, et al. discloses an information processing system having a dynamically variable keyboard terminal which enables the user to define sets of symbols and formats for the keyboard. U.S. Pat. No. 4,281,315 issued to H. C. Bauer et al, 28 July 1981 discloses a multipoint polling system for the collection of messages from data terminals using different protocols and formats. The Bauer et al system stores sets of instructions individually defining different ones of several communications procedures and, as each item on a polling list is accessed, the instruction set defining the protocol used by the terminal to be polled and controlling the controller sending and receiving equipment is accessed with the instruction set.

U.S. application Ser. No. 310,182, entitled System for Converting Data Processing Information to Text Processing Information and Vice Versa filed 9 Oct. 1981 by R. Amezcua et al discloses a method and means for operating an interactive terminal for data processing system which is capable of accessing information from the data processing system data base, copying the information into the text processing system memory, and automatically converting the information from the data processing system format into the text processing system format.

All of the prior art systems discussed provides some means for interaction between the system operator and the system control program for formatting data that is input to the system or communicated to or from the system. However, none of the prior art systems address the problem of communications between two or more information processing systems wherein the systems' internal data code format or structure is incompatible such that internal character representations are not common and the character sets are not coextensive.

DISCLOSURE OF THE INVENTION

The present invention provides a method and apparatus which enables an information processing system operator to interactively build into the systems memory data and instruction code definitions which permit the information processing system to transform data and control codes communicated from a remote information processing system which operates in a different internal code format into the internal code format of the receiving information processing system. The method includes a control program for operating the information processing system in an interactive mode with the operator. The control program displays prompts and command options to the operator and a transform table which allows the operator to enter characters in the format code of the receiving system to which input characters from the remote system are to be transformed. The method includes means for transforming single byte input characters to single byte characters, transforming single byte input characters to multibyte characters sequences, and transforming multibyte character control sequences to multibyte character sequences. Once the transform values are established by the operator in the transform profile the transform may be used to process input data immediately or stored in system storage for a later recall. The transform file values established are reversible in that the same transform can be used to transform the code of the receiving system back to the code of the remote transmitting system for a transmission of data from the receiving system to the remote system.

BEST MODE FOR CARRYING OUT THE INVENTION

Figure 1:
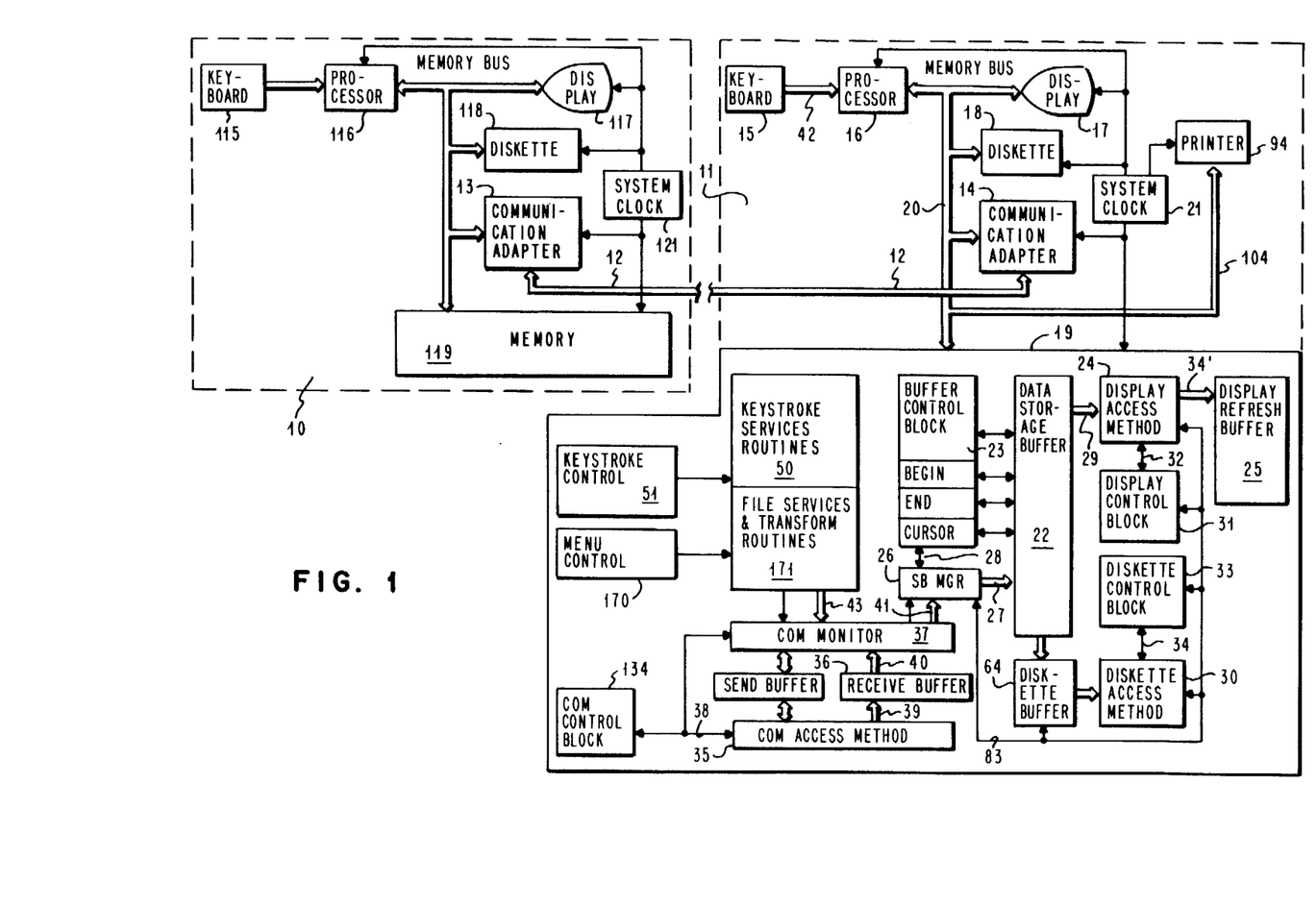
FIG. 1 is a logical block diagram showing the apparatus of the present invention.

With reference to FIG. 1, a communication system in accordance with the present invention is shown. Communication system comprises a first data terminal 10 and a second data terminal 11 remote from said first terminal. For purposes of this description, the first data terminal 10 will be in the transmitting mode and will be referred to as the transmitting terminal while the second terminal 11 will be in the receiving mode and will be referred to as the receiving terminal. The two terminals communicate with each other over a bus 12. Each of the terminals comprises a communication adapter, 13 and 14, each respectively connected to bus 12. The communication adapters may be any standard device having the capability, at the transmitting end, of converting parallel to serial data so that the data may be communicated over external lines and, at the receiving end, for reconverting the received serial data into parallel form so that it may be handled by the receiving data terminal. Such communication adapters will not be described in detail since they are not involved in the present invention which is directed to how transmitted data is handled once it is received at the receiving terminal.

In any event, the mode of communication over bus 12 which represents the link between the two terminals is serial communication. A communication adapter which can be used in the present invention is described in detail in copending application D. M. Benignus et al assigned to the assignee of the present invention and identified with U.S. application Ser. No. 274,300, filed 16 June 1981, now U.S. Pat. No. 4,467,445, issued 8/21/84. For purposes of describing the communications adapter, said copending application is hereby incorporated by reference.

In the present embodiment, the transmitting terminal 10 operates in Extended Binary-Coded Decimal Interchange Code (EBCDIC) and the receiving terminal 11 operates in American National Standard Code for Information Interchange (ASCII). While the description of the best mode for carrying out the invention will be made based on these two code formats, it is understood that this is by way of example only and that our invention is equally useful and effective in transforming other code formats.

The following description of operation, made with respect to the receiving terminal 11, is also substantially applicable to transmitting terminal 10. In receiving data terminal 11, the operator accesses the machine through operator control keys on keyboard 15. The keyboard drives a processor 16. The processor 16 is operably interconnected into a visual display 17, a diskette 18, and a random access memory 19 by a memory bus 20. A system clock 21 is provided for timing functions within data terminal 11.

The information transmitted from data terminal 10 to remote data terminal 11 is serially sent over bus 12 to communications adapter 14. Communications adapter 14 does a serial to parallel conversion of the input data and sends it over memory bus 20 to memory means 19 which has the capability of storing the received data and displaying it on visual display 17 as soon as it is received or at some subsequent time. Memory 19 includes a number of data areas and functional programs for operating with the data input into it through bus 20 from the communications adapter 14. The received data sent to memory 19 from communication adapter 14 over memory bus 20 is stored in data storage buffer 22 sequentially in the order in which it is received. The handling and updating of the data stored in data storage buffer 22 is controlled by routines stored within storage buffer manager (SB) block 26. These routines will be subsequently described further. A display access method program 24 controls the formatting of alphanumeric data representative of the stored data on visual display screen 17 through display refresh buffer 25. It should be noted that the display refresh buffer 25 may operate in any conventional manner. However, in the present example, a "BUILD" subroutine is used which is described in copending U.S. application Ser. No. 208,568 filed 11/20/80, now U.S. Pat. No. 4,445,194, issued 4/24/84, W. C. Cason et al.

Storage buffer (SB) manager block 26 is connected to data storage buffer 22 by channel 27. The storage buffer manager block 26 is further connected to buffer control block 23 through a channel 28. As we previously indicated, the data representative of the alphanumeric characters is input into buffer 22. The data representative of characters is stored sequentially in data storage buffer 22 in the order in which it is received. For convenience in description, this data will be referred to as text character data. In displaying the characters, text character data stored in buffer 22 is communicated to display access method 24 over channel 29. It should be noted that corresponding diskette access method block 30 is used instead of access method block 24 when communication between the data storage buffer 22 and the diskette 18 is desired.

A display control block 31 is connected through a channel 32 with display access method block 24. The corresponding diskette control block 33 communicates with diskette access method block 30 over channel 34 when access to the diskette drive is required.

In any event, as soon as the information from communication adapter 14 is received by the storage buffer manager 26 it is translated and the text data is sent to data storage buffer 22. This information is transmitted over channel 29 to display access method 24 and then via channel 34 to display refresh buffer 25. The information stored in display refresh buffer 25 is representative of the actual alphanumeric information shown on display 17. The display control block 31 serves to store flags and status information as required by the operation of display access method block 24.

It should be noted that we previously described received data being transferred from the communication adapter 14 to the data storage buffer 22 over bus 20. Actually the process involves several steps. Information from a communication adapter 14 is put on to bus 20 which takes the data to communication access method block 35 under the direction of communication control block 134 after which the data is input over channel 39 to receive buffer 36 and then over channel 40 to communications monitor 37. Information from the communications monitor 37 is input over channel 41 to storage buffer manager block 26 previously described. Then the data is input to the text storage buffer 22 over channel 27 under the direction of buffer control block 23.

The terminal interacts with the operator through the display 17 and keyboard 15. Messages and prompts are displayed to the operator on display 17 to provide information as to system status and operator command options. The operator prompts and command options are displayed in menu format under control of menu control 170. The command options enable the operator to invoke the various system functions including the code format transform of the present invention stored in section 171 of memory 19 as will be discussed in more detail later.

Since the operator controls processes being described through a keyboard 15 communicating through processor 16, standard keyboard entry processes should be described. As the operator enters each key stroke at the keyboard 15, a corresponding signal is transmitted through channel 42 to processor 16 which enters the key stroke command into the memory 19. In the memory, upon the receipt of a key stroke command, a key stroke routine is produced from key stroke service routine block 50 to handle the particular command received. This is carried out under the control of key stroke control block 51. The key stroke command is then processed via channel 43 through communications monitor 37 and channel 41 to the storage buffer manager block 26 which has the program to control buffer control block 23 to carry out various processes with respect to the data stored in the data storage buffer 22.

Using the hardware just described in FIG. 1, the processes of handling the received data in accordance with the present invention will now be considered.

Let us assume that transmitting terminal 10 sends data over bus 12 to remote receiving terminal 11 and let us assume that receiving terminal 11 is a data processing terminal which operates in ASCII while the sending terminal 10 is a text processor which operates in EBCDIC.

Figure 2:
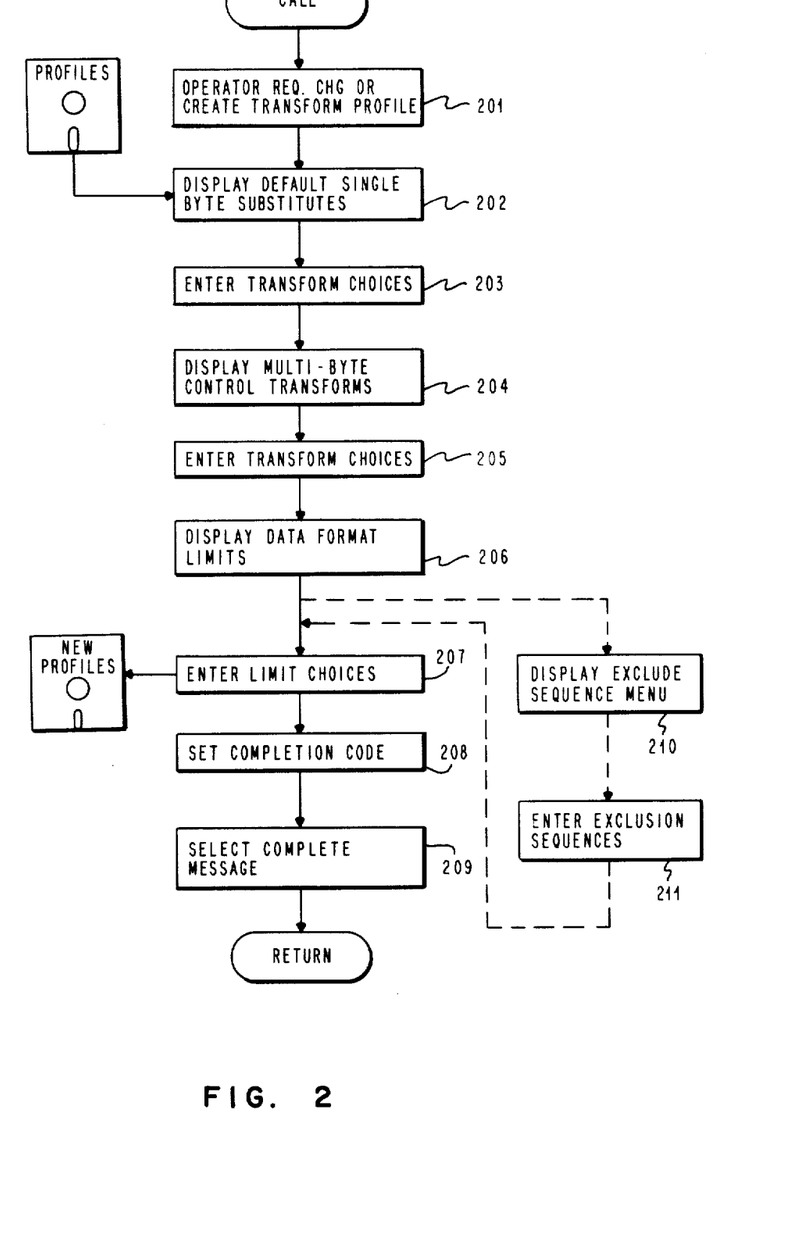
FIG. 2 is a flow diagram of the operation of the menu prompt function of the present invention.

Prior to establishing the communication session between transmitting terminal 10 and remote receiving terminal 11, the operator of terminal 11 uses the keyboard 15 to access the menu control function 170 to display the Code Format Transform menu on display 17. The storage buffer manager 26 accesses the code format transform routine from memory section 171 to control the display access method 24 to display the appropriate menu screens for the code format transform on display 17. FIG. 2 shows a flow diagram of the order of presentation of menu options to the operator. The first option presented to the operator in step 201 is the option to change an existing code format transform or to create a new code format transform profile. The operator selects from these two options by using the keyboard 15 to cause the display cursor to be displayed under the desired option and depressing a "enter" key on the keyboard 15. If the operator selects the change transform profile option, the name of an already existing transform profile must be entered through the keyboard 15 and the system will access the transform from diskette storage 18 into the data storage buffer 22. For purposes of this description, we will assume that the operator selects to create a new transform profile.

When the operator positions the cursor underneath the create option on the display 17 and depresses the keyboard "enter" key, the transform routine takes control of the storage buffer manager 26 and accesses the diskette 18 to read into data storage buffer 22 the menu options for a new code format transform. In step 202 of FIG. 2, the list of single byte EBCDIC are displayed with predefined default ASCII transform characters. For example, all lower case alphabetic characters in EBCDIC is displayed as being transformed to equivalent lower case characters in ASCII. The operator has the option to change any of the default characters to a desired character by using the keyboard 15 to place the display cursor under the character to be changed and then keying in the change from the keyboard 15. For example, lower case EBCDIC "a" could be changed to numerical "1" in ASCII if the operator desired.

Once the single byte character transforms are as desired by the operator, the operator stores them as a part of the transform profile in block 203 by depressing the keyboard "enter" key.

In block 204, EBCDIC multibyte control characters are displayed to the operator for transform definition. An example of a multibyte control character is a text format control such as tab definition sequence. The operator selects a combination of ASCII characters to represent the EBCDIC multibyte control character.

In block 205, depression of the "ENTER" key by the operator causes the selected multibyte control transforms to be stored in the transform profile. After the multibyte control transforms have been selected, in step 206, the transform routine displays a menu to the operator to select data format limits. The data format limits define the number of ASCII characters to be formatted into each ASCII data unit and the number of data units to be placed in each data unit group. Step 207, the operator enters the selected limit choices and in step 208 the transform routine sets a completion code and storage buffer manager 26 accesses menu control 170 to display a selection complete message to the operator on display 17. The completed transform profile is then stored on the diskette 18.

Steps 210 and 211 are shown as dotted line options which may be provided to enable the operator to exclude any desired EBCDIC characters from being transformed to ASCII characters. If this feature is included, then the excluded characters will be replaced by any other ASCII character selected by the operator. The use of this menu option results in a nonrecoverable code conversion.

Table 1 shows an overall implementation of the flow diagram of FIG. 2 in high level program definition language.

TABLE 1

```
OPSYSTEM FILE CONVERSION
DO WHILE RETRY_MAIN,RETURN_TO_OPSYSTEM,HOST_TIMEOUT,
   AND CANCEL_TASK = FALSE
   DISPLAY AND PROCESS FILE CONVERSION TASK MENU
   DO WHILE RETURN_TO_OPSYSTEM,HOST_TIMEOUT, AND
      CANCEL_TASK = FALSE
      IF CONVERSION_TASK = TEXT_TO_OPSYSTEM
         CONVERSION
            DISPLAY AND PROCESS TEXT_TO_OPSYSTEM MENU
            READ PROFILE INTO MEMORY
            OPEN TARGET FILE
            DO WHILE MORE PAGES IN DOCUMENT = TRUE
               DO WHILE MORE CHARACTERS IN PAGE = TRUE
                  GET EBCDIC CHARACTER AND ANALYZE
                     CHARACTER
                     IF CHARACTER TYPE = VALID CHARACTER
                        CONVERT CHARACTER TO ASCII
                           SEQUENCE
                        OUTPUT CHARACTER
                     IF CHARACTER TYPE = MULTI_BYTE_
                        TRIGGER CHARACTER
                           CONVERT MULTI_BYTE_TRIGGER
                              CHARACTER TO ASCII SEQUENCE
                           OUTPUT CHARACTER SEQUENCE
                     IF CHARACTER TYPE = EXPANDED_
                        TRIGGER
                        CONVERT HEX CHARACTER
                        OUTPUT CHARACTER SEQUENCE
                     ELSE (INVALID CHARACTER)
                        SET RETURN CODE FOR INVALID
                           CHARACTER
                     ENDIF
                     GET NEXT CHARACTER
               ENDDO
               GET NEXT PAGE
            ENDDO
      ELSE (CONVERSION TASK = OPSYSTEM_TO_TEXT
         CONVERSION)
            DISPLAY AND PROCESS OPSYSTEM_TO_TEXT MENU
```

TABLE 1-continued

```
    READ PROFILE INTO MEMORY
    OPEN SOURCE FILE
    DO WHILE MORE CHARACTERS = TRUE
      GET ASCII CHARACTER AND ANALYZE CHARACTER
      IF CHARACTER TYPE = VALID CHARACTER
        OUTPUT CHARACTER
      IF CHARACTER TYPE = CONTROL SEQUENCE
        MULTI_BYTE_TRIGGER
          CONVERT ASCII SEQUENCE TO MULTI_BYTE_
            TRIGGER CONSTRUCT
          OUTPUT CHARACTER SEQUENCE
      IF CHARACTER TYPE = NORMAL MULTIBYTE
        SEQUENCE
          OUTPUT CHARACTER SEQUENCE
      ELSE (INVALID CHARACTER -
        NONTRANSLATABLE)
          OUTPUT INVALID STRUCTURE
      ENDIF
    ENDDO
  ENDIF
  ENDDO
ENDDO
```

Figure 3:
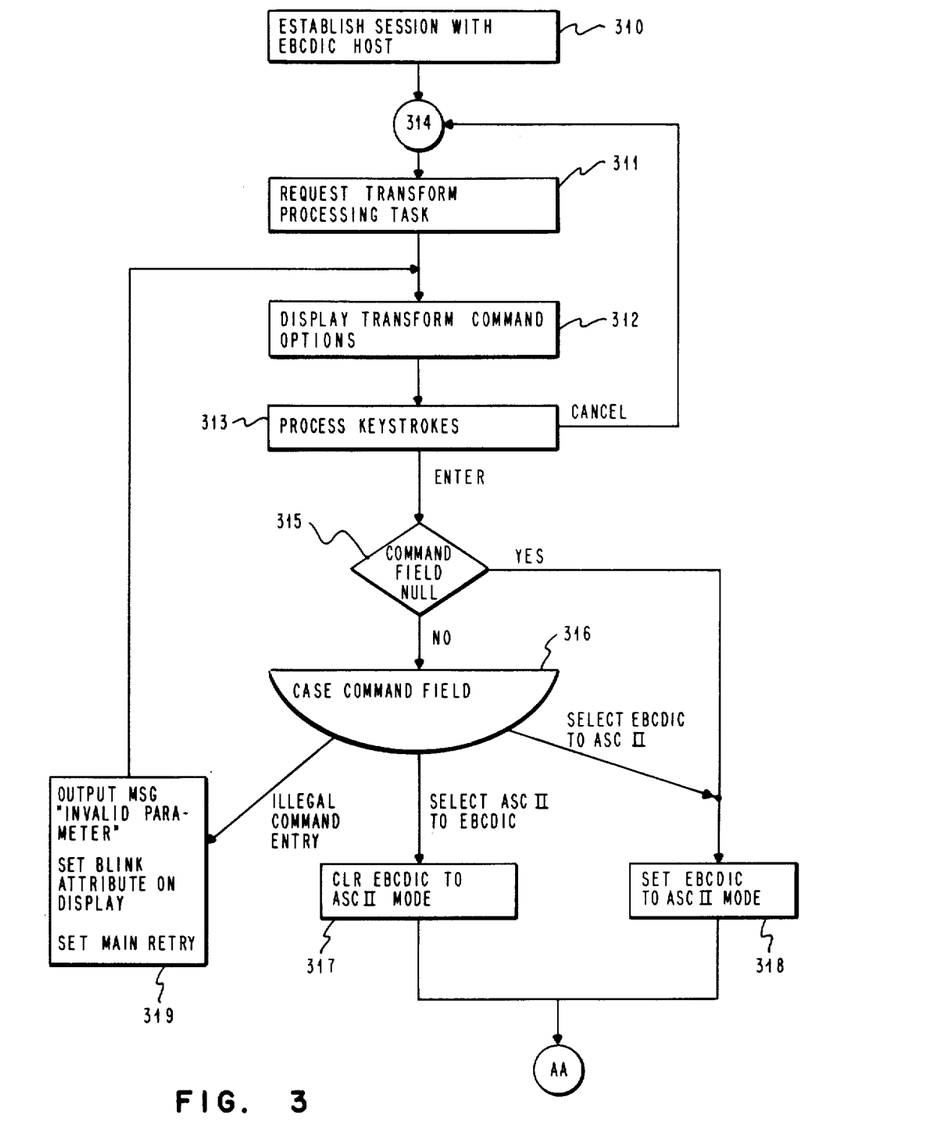
FIG. 3-10 are flow diagrams of the operation of the present invention in transforming EBCDIC data to ASCII data.
Figure 4:
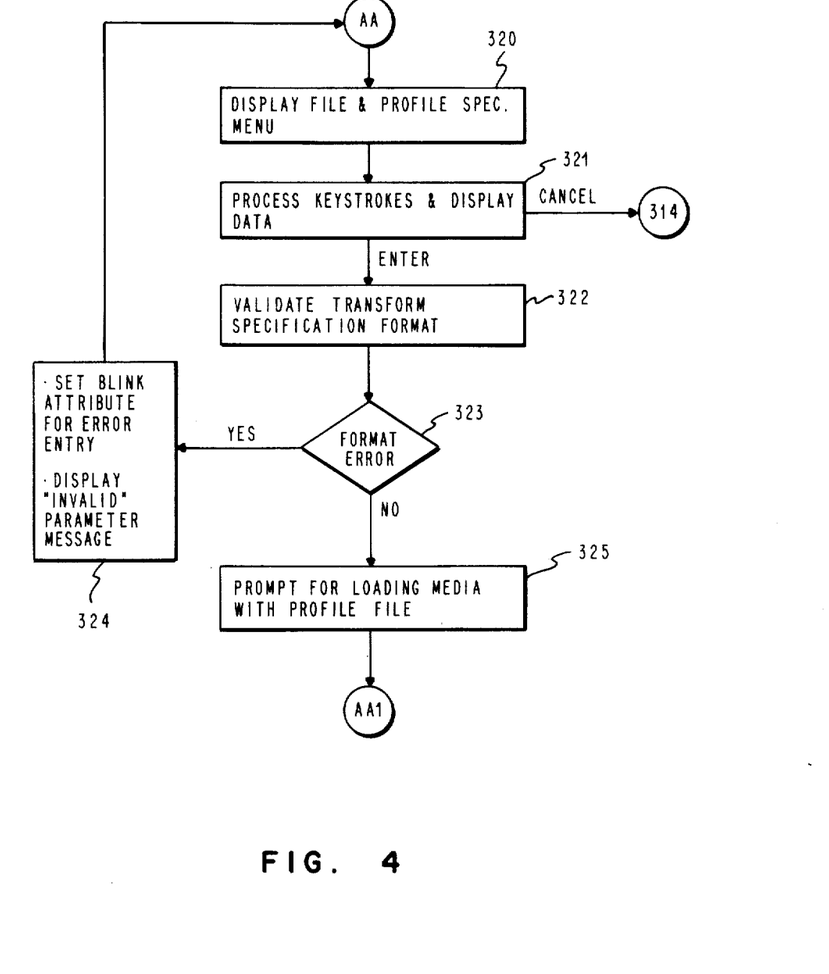
Figure 5:
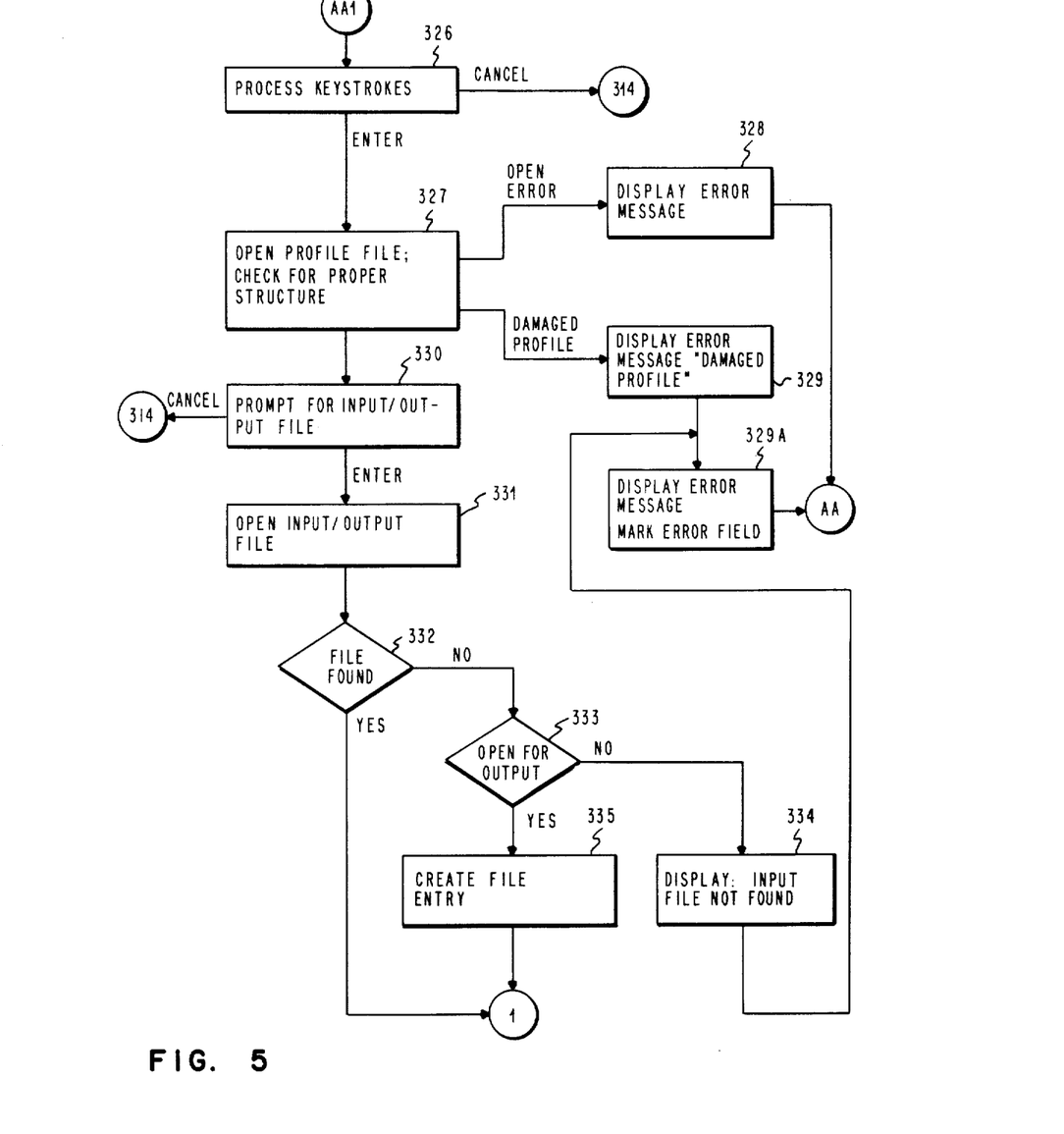
Figure 6:
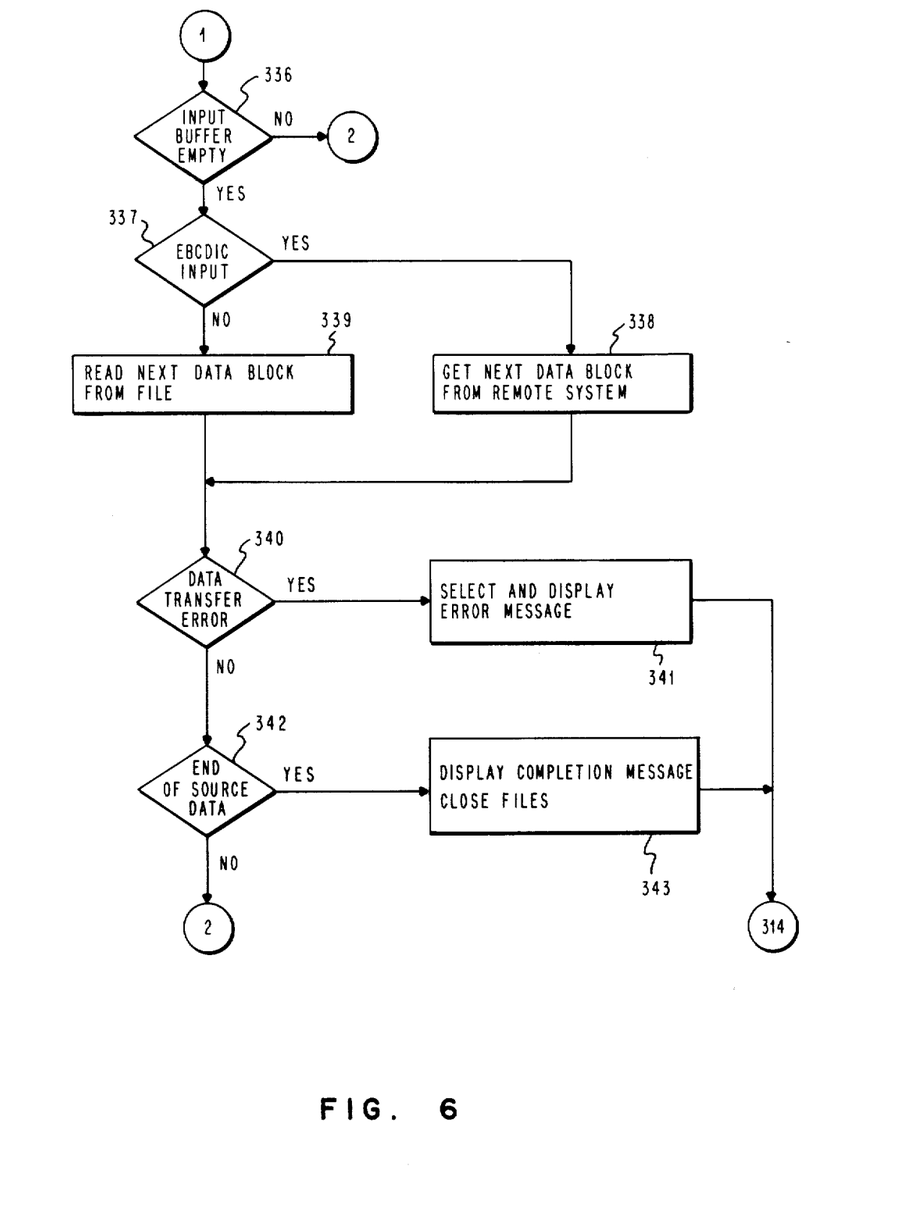
Figure 7:
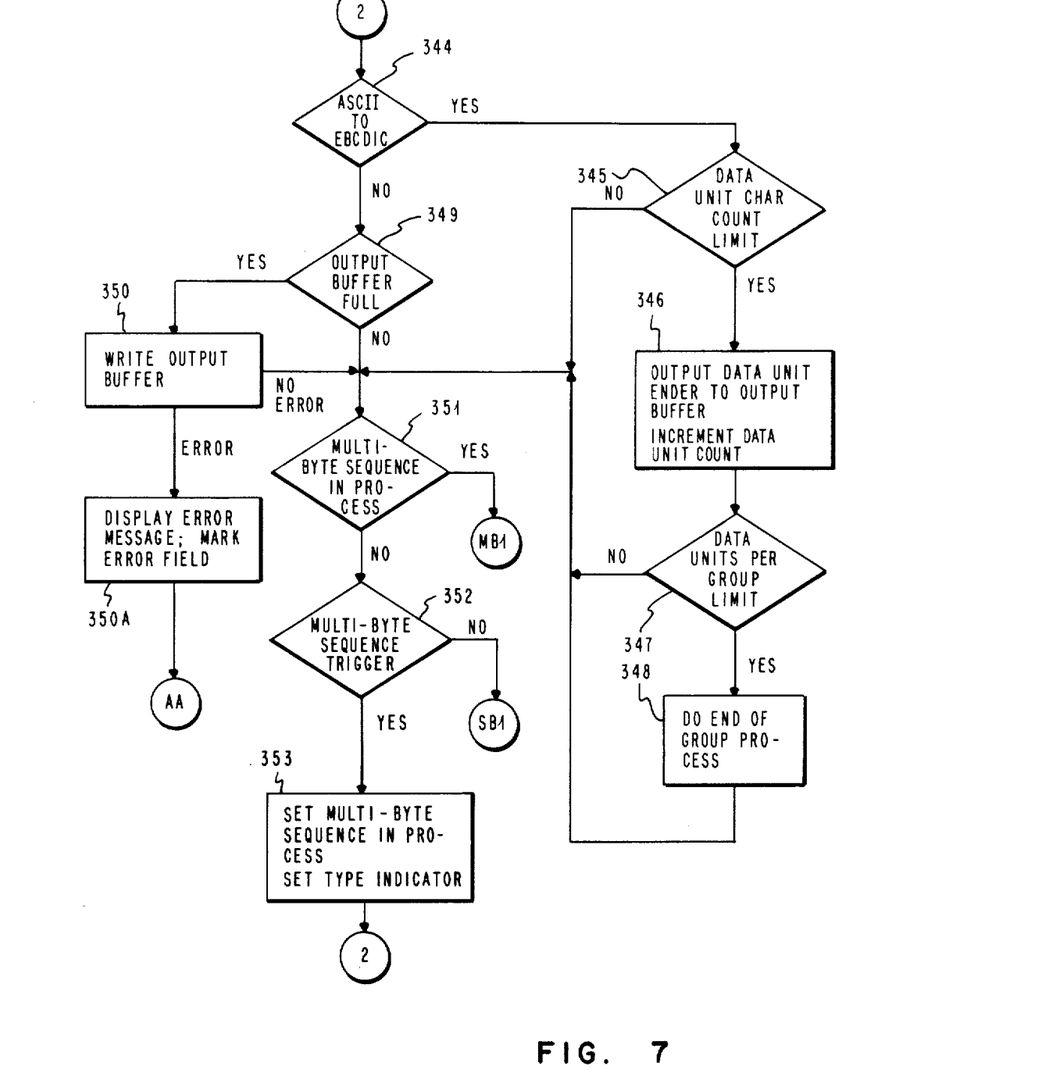
Figure 8:
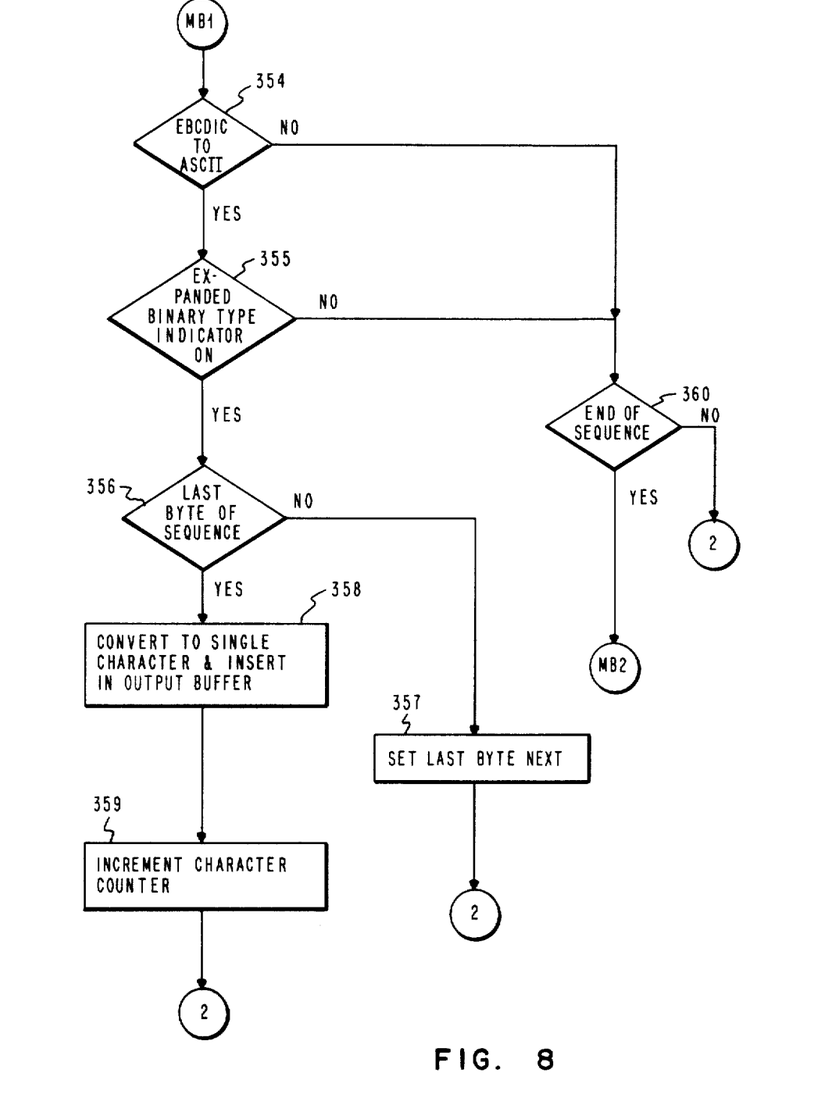
Figure 9:
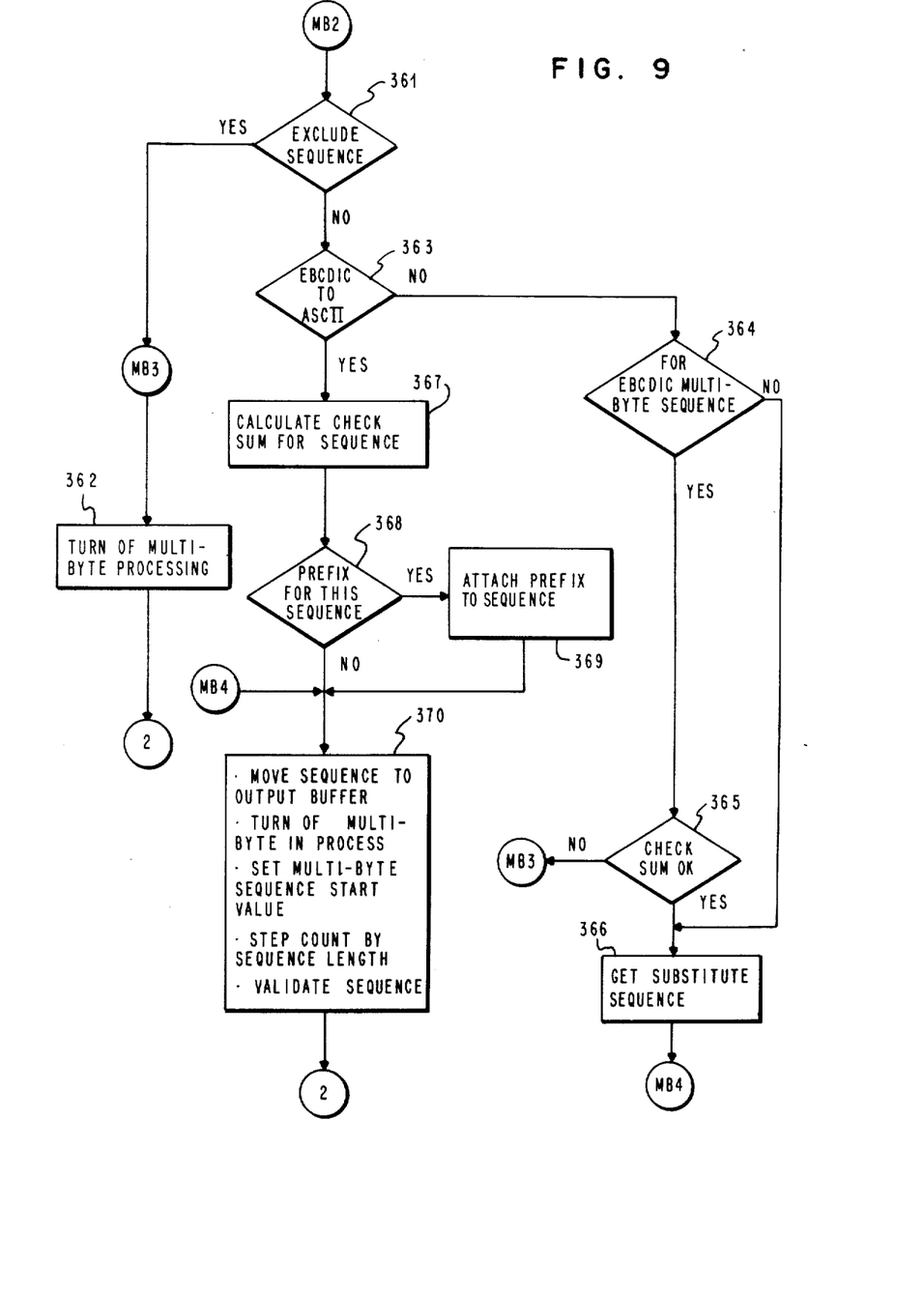
Figure 10:
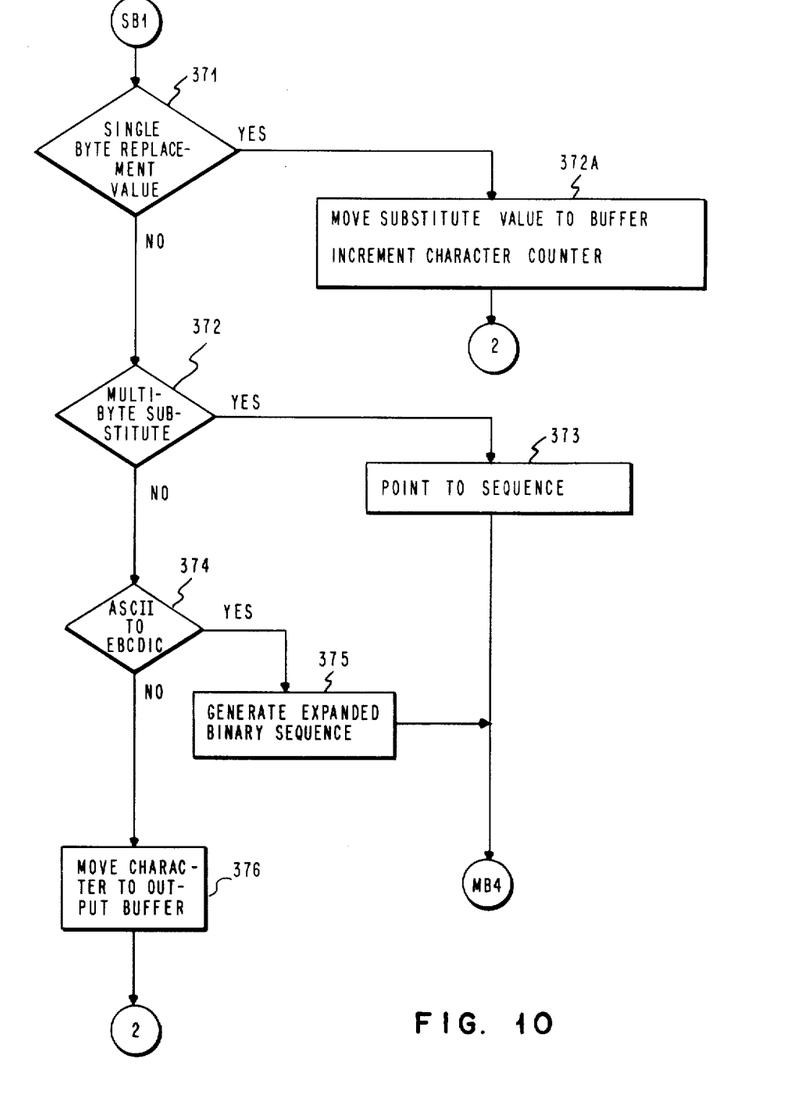

The operation of the present invention will now be described with reference to FIGS. 3-10. The operation is described from the point of reference of data terminal 11 operating in a data processing mode using the ASCII code format. Assume that data terminal 10 with which the operator of data terminal 11 desires to communicate is operating as a text processing terminal using the EBCDIC code format. Referring to FIG. 3, the operator of data terminal 11 establishes a communication session with data terminal 10 over telephone lines in the conventional manner as described above. The operator then interacts with data terminal 11 through keyboard 15 to request the transform processing task in block 311 and the storage buffer manager 26 under control of the transform routine stored in memory section 171 displays the transform menu as previously described with reference to FIG. 2. In block 313, keystrokes input by the operator through keyboard 15 are processed under control of keystroke control 51 and keystroke services routines stored in memory section 50. The keystrokes are temporarily stored in the data storage buffer 22 until either a CANCEL KEY or ENTER KEY is depressed. If the CANCEL KEY is depressed, processing returns through block 314 to 311 and the transform menu is redisplayed.

When an ENTER KEY depression is detected by the transform routine, the command field of the menu is examined at block 315 to determine if it is null. If the command field is nulled, then the routine branches to block 318 wherein a default command is said to indicate that the code transformation is from EBCDIC to ASCII. When the command field is not null, then the routine proceeds to block 316 wherein the command field is examined. If the command field is determined to contain the command to transform EBCDIC to ASCII code, then processing proceeds to block 318, as in the default case. When the command indicates a transform from ASCII to EBCDIC, processing proceeds to block 317 wherein the EBCDIC to ASCII mode is cleared.

When the character contained in the command field is neither a null, or one of the defined transforms, it is assumed to be illegal and processing proceeds to block 319 wherein a message is displayed to the operator indicating an illegal command and processing returns to the transform main menu.

Assume that the EBCDIC to ASCII transform is selected. Processing proceeds to block 320 wherein a menu is displayed to the operator prompting the operator to identify the input/output file name and its specific media location, e.g., the diskette on which the file is located. The operator is also prompted to identify the code format transform name and its media location. In block 321, the keystrokes entered by the operator at keyboard 15 to answer the prompts are processed and the keyboarded data is displayed. If the CANCEL KEY is depressed, then processing again returns to node 314 and the main menu is again displayed.

When the ENTER KEY is depressed, processing proceeds to block 322 wherein the media location and file names entered by the operator are validated according to the system configuration. If an error is found in the transform specification, then, block 323, transfers processing to block 324 wherein menu controlled at 170 is accessed to display a message to the operator indicating an invalid parameter has been entered. Processing then returns to block 320 to display the file name and location prompts again.

If no format error is detected at block 323, then processing proceeds to block 325 wherein a prompt is displayed to the operator to load the appropriate diskette if the media location specified in block 322 is not currently available to the system.

In block 326 the transform routine continues to process the operator's keystrokes after its has been determined that the proper diskette is mounted. When the next ENTER KEY is detected in block 327, a profile file is opened for the transform based on the preceding keystrokes. If an error is detected in the process of opening the file, an error message is displayed to the operator in block 328 and the menu with the file specification is redisplayed in block 320.

If the transform profile file is successfully opened on the diskette, the profile is read into memory and its structure is validated. If the structure is proper, the processing continues in block 330. Otherwise, an error message is displayed in block 329 and 329A and processing returns to block 320 wherein the format specification menu is again displayed.

In block 330, the operator is prompted for the input/output file name. If the file to be opened is for output, and the file does not exist in the specified media location, a new file is created in block 335. Otherwise, the existing file is opened. If the file is opened for input, and is not found in the specified media in block 332, an error message is displayed in block 334, the error field is marked on a display in block 334A and processing returns to block 320 to redisplay the file specification menu.

Assume that the file name is found in block 332. Processing proceeds to block 336 wherein a test is conducted to determine if the input buffer in the data storage buffer 22 is empty. If the input buffer is empty, processing proceeds to block 337 wherein the source of input data is checked. Assume that the source of input data is from the remote text terminal 10, then the next block of data is accessed from the communication receive buffer 40 in block 338. The second option shown in block 339 operates to transform data stored in a local media file such as on a diskette. In block 340, if an error is detected during the accessing of data, an error message is displayed in block 341 and processing returns to the main task selection menu 311.

As data is transferred, the system continually monitors the data looking for an end of data signal in block 342. When end of data is detected, a completion message is displayed to the operator in block 343, the files are closed, and processing returns to the main menu 311.

Referring now to block 344, the command status is checked to determine if the transform is converting ASCII code to EBCDIC code. If the status is yes, then the limit parameters of the profile are checked in step 345. When the number of characters per data unit specified by the limit parameter has been reached or exceeded, then, in block 346, the routine will insert the user specified data unit ender code character immediately preceding any multibyte sequence which spans the character per data unit limit. A multibyte sequence which spans the limit of the characters per data unit will be moved the start of the next data unit buffer and the current character count will be set equal to the number of bytes in the sequence. If no multibyte sequence spans the limit, the data unit character is zeroed. Next, in block 347, the data unit count is compared to the data unit group limit. When the number of data units per group has been reached with this data unit, then end of data unit group processing is executed in block 348 and the data unit count is set to zero.

Referring back to block 344, if the command status was not to transform ASCII to EBCDIC, then processing proceeds to block 349 wherein the output buffer is examined to determine if it is full. If the buffer is full, then its contents are written from data storage buffer 22 to the diskette 18 in block 350 with error checking being performed in block 350A. When the output buffer is not full, processing continues in step 351 wherein a status register is checked to determine if the next character in the input buffer is part of a multibyte character sequence which is in process. If it is, processing branches to node MB1. If a multibyte sequence is not in process, processing continues to step 352 wherein the next character is examined to determine if it is a multibyte sequence trigger. If the character is a multibyte sequence trigger, then the multibyte sequence in process status indicator is set and the type of multibyte trigger is set in step 353. Processing then branches back to block 344 to check the transform command status and examine the next character. Referring again to blocks 351 and 352, when no multibyte sequence is in process and the multibyte sequence trigger is not set, then the character under consideration is presumed to be a single byte character and processing branches to node SB1.

Referring back to step 351 and assuming that the status indicator indicated that a multibyte sequence was in process, as previously indicated processing branches to node MB1 and continues in step 354 wherein the transform command status is checked to determine if the transform is from EBCDIC to ASCII. If the conversion is from EBCDIC to ASCII and if in step 355 the multibyte sequence type is expanded binary and this is the last byte of the sequence, then the single binary byte is determined in block 358 and inserted into the output buffer. In block 359, the character count is incremented and processing branches back to node 2. Referring back to step 356, if the multibyte sequence type is expanded binary and the current character is the next to last byte of the sequence, the last-byte-next indicator is set in block 357 and processing returns to node 2.

Referring back to block 355, if the expanded binary type indicator was not on, processing branches through block 360 wherein the current character is examined to determine if it is the end of the multibyte sequence. If the current character is not the end of the multibyte sequence, processing returns to node 2 to fetch the next character. If the current character is the end of the multibyte sequence, then, processing branches from step 360 to node MB2. In block 361, the character sequence under consideration is examined to determine if it is to be excluded from output. If the sequence is to be excluded from output, then the multibyte sequence in process indicator is reset and processing returns to node 2 to fetch the next character to be processed.

If the character sequence is not an exclude sequence, processing branches to block 363 wherein the transform command is checked to determine if the transform is from EBCDIC to ASCII. If it is not, processing branches to block 364 where the multibyte sequence status is checked. If the multibyte sequence status is set, the sequence check sum is tested for validity. If the check sum is correct, the operator specified substitution is placed in the output buffer at block 366 and control branches to node MB4. If the check sum is not valid, then the sequence is excluded from the output buffer and the multibyte sequence in process indicator is turned off at block 362.

When the test at block 363 is yes, then, a check sum for the sequence is calculated in block 367 and included in the multibyte character sequence. If the operator specified a prefix for this multibyte sequence during menu setup, then, the prefix is attached to the sequence in block 369. Processing then continues in block 370 where the complete sequence is then moved to the output buffer, the multibyte processing indicators are cleared, a count is set for the multibyte sequence size, the multibyte sequence start pointer is set and the entire multibyte sequence is validated. Processing then branches to node 2 to fetch the next character from the input buffer.

Referring back to block 352, recall that a branch was taken to node SB1 when no multibyte sequence was in process and the next character was not a multibyte sequence trigger. In block 371, the transform file initially set up by the operator is tested to determine if there is a single byte replacement value for the current input character. If yes, processing branches to block 372A wherein the substitute value is moved to the output buffer, the character count is incremented and processing branches back to node 2 to read the next input character.

When there is no single byte replacement value for the current input character as determined in block 371, processing branches to block 372 wherein the transform file is checked to determined whether there is a multibyte substitute for the single byte input character. If yes, processing branches to block 373 wherein the address of the multibyte sequence is selected and processing branches to node MB4 wherein the character sequence is moved into the output buffer as previously described.

When there is no multibyte sequence substitute for the single byte input character, processing branches to block 374 wherein the transform command status is checked to determine if the transform is from ASCII to EBCDIC. If yes, the unknown character is converted to an expanded binary sequence and moved to the output buffer. Otherwise, the character is moved to the output buffer in block 376 and control returns to node 2 to fetch the next character.

An implementation of the invention for operating the IBM Personal Computer in communication with the IBM 5520 Administrative System is disclosed in the appendix filed with this application. The implementation is written in high level program definition language (PDL).

While the invention has been particularly shown and described with reference to a preferred embodiment it will be understood by those skilled in the art that various other changes in form and detail may be made without departing from the spirit and scope of the invention.

We claim:

1. In a data communication system including a first information processing system which operates on internal code of a first format and a second information processing system which operates on internal code of a second format different from said first format, an interactive control system for transforming the communicated code of said first information processing system to the format of the code of said second information processing system comprising:

means connected to said second information processing system for displaying to an operator of the second information processing system a menu of code format transform tasks available for operator selection;

means connected to said second information processing system and responding to the selection of one of said code format transform tasks by the operator for displaying a transform file of characters and control instructions of said first information processing system together with corresponding default characters and control instructions in the format of the second information processing system;

means connected to said second information processing system and responding to the display of said transform file for selectively replacing certain ones of said default characters and control instructions in said transform file with characters and control instructions selected by the operator; and means connected to said second information processing system and responding to the replacement of said default characters and control instructions for merging said transform file into a transform program for transforming the communicated code of said first information processing system to the format of the code of said second information processing system.

2. The interactive control system of claim 1 wherein said means for selectively replacing certain ones of said default characters and control instructions includes means for replacing a single byte character of the first format with a single byte character of the second format.

3. The interactive control system of claim 1 wherein said means for selectively replacing certain ones of said default characters and control instructions includes means for replacing a single byte character of the first format with a multi-byte character sequence of the second format.

4. The interactive control system of claim 1 wherein said means for selectively replacing certain ones of said default characters and control instructions includes means for replacing multi-byte character sequences of the first format with multi-byte character sequences of the second format.

5. In a data communication system including a first information processing system which operates on internal code of a first format and a second information processing system which operates on internal code of a second format different from said first format, a method for interactively transforming the communicated code of said first information processing system to the format of the code of said second information processing system comprising the steps of:

(a) displaying to an operator of the second information processing system a menu of code format transform tasks available for operator selection;

(b) selecting one of said code format transform tasks in response to an operator input to the data communication system;

(c) displaying a transform file of characters and control instructions of said first information processing system together with corresponding default characters and control instructions in the format of the second information processing system;

(d) selectively replacing certain ones of said default characters and control instructions in said transform file with characters and control instructions selected by the operator; and (e) merging said transform file into a transform program for transforming the communicated code of said first information processing system to the format of the code of said second information processing system.

6. The method of claim 5 wherein step (d) further includes selectively replacing single byte characters of the first format with single byte characters of the second format.

7. The method of claim 5 wherein step (d) further includes selectively replacing single byte characters of said first format with multi-byte character sequences of the second format.

8. The method of claim 5 wherein step (d) further includes selectively replacing multi-byte character sequences of the first format with multi-byte character sequences of the second format.

* * * * *